Jan. 3, 1961 R. G. HERB 2,967,223
FEEDER MECHANISM
Filed Nov. 26, 1958 5 Sheets-Sheet 1
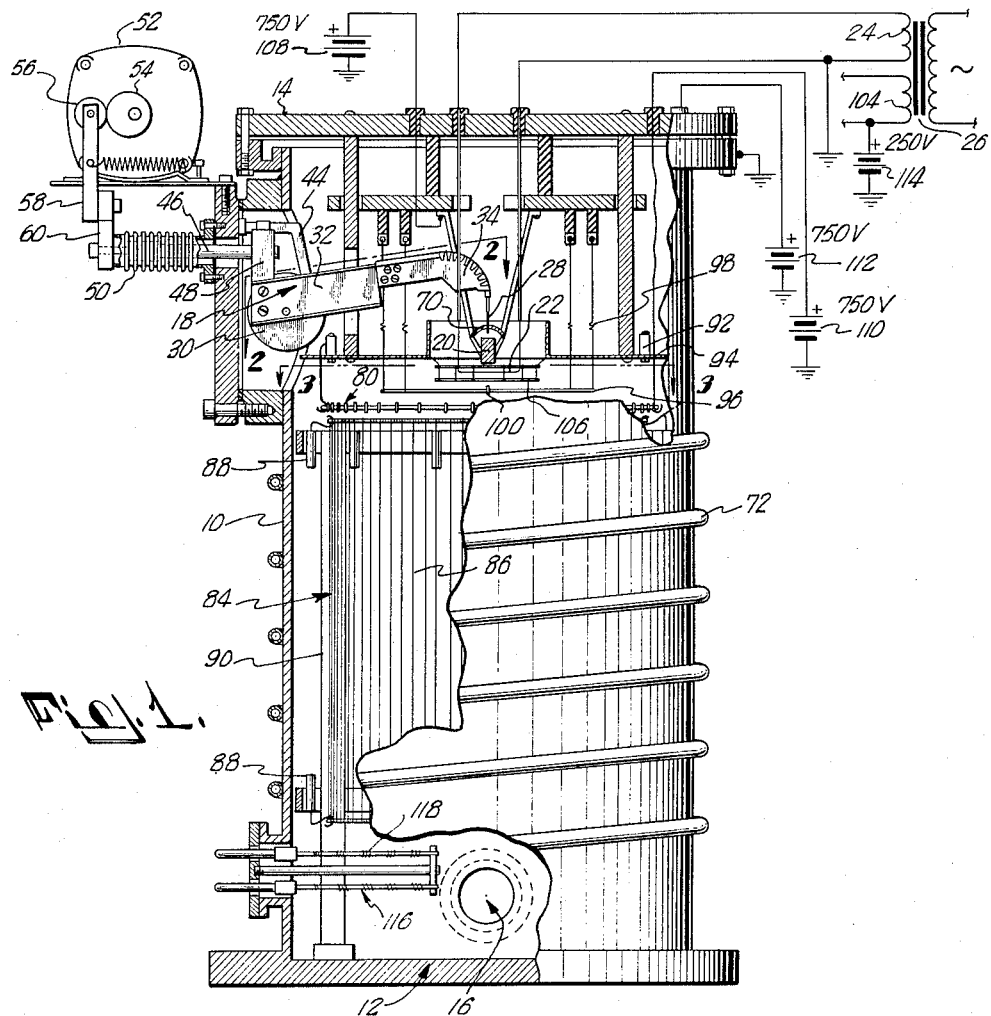
INVENTOR.
RAYMOND G. HERB
BY
Christie, Parker & Hale
ATTORNEYS.

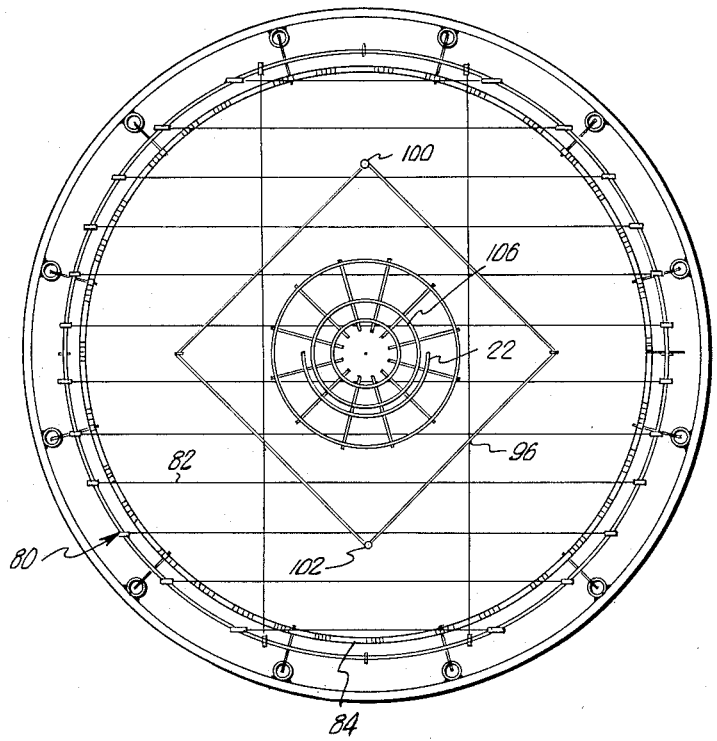

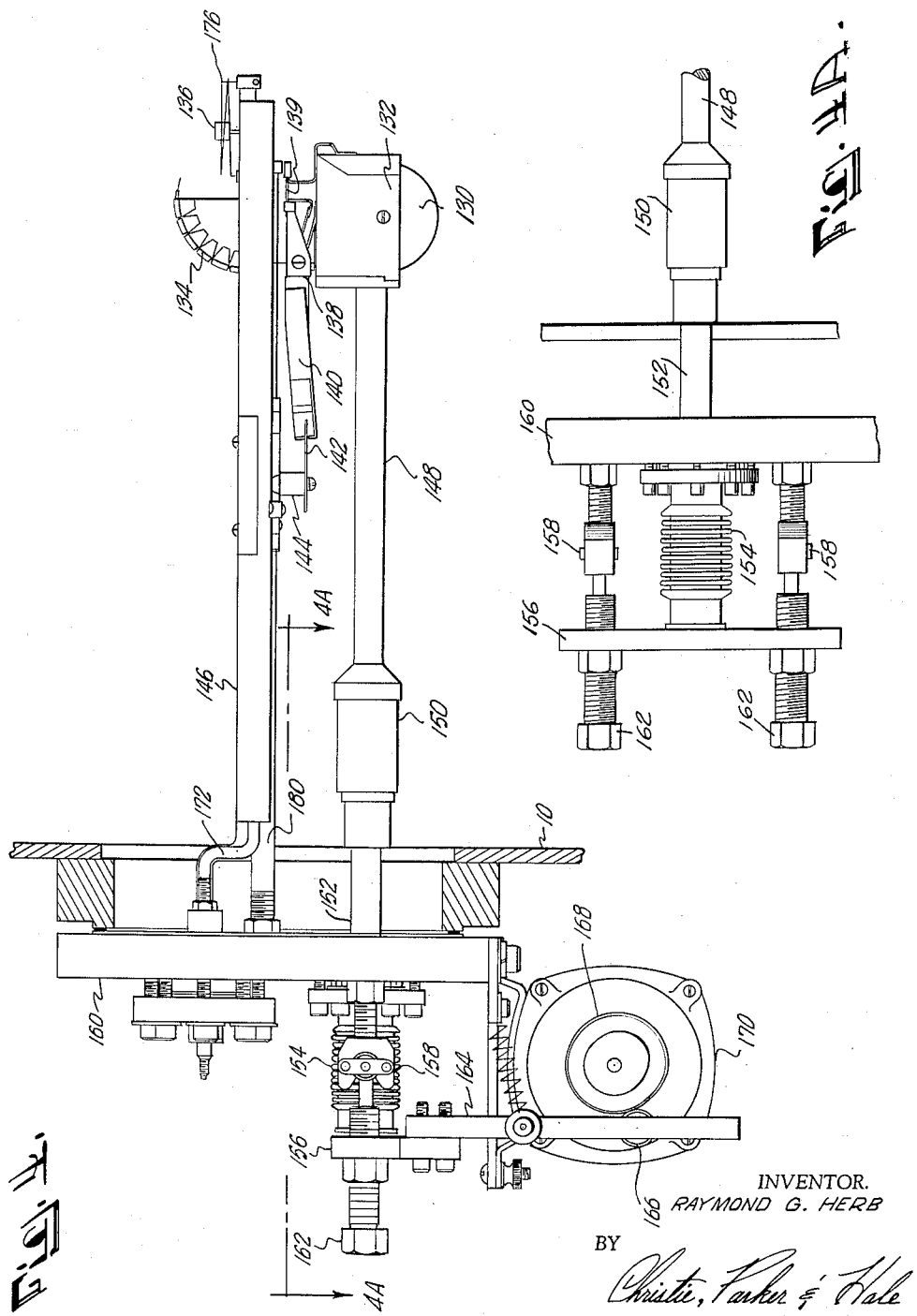

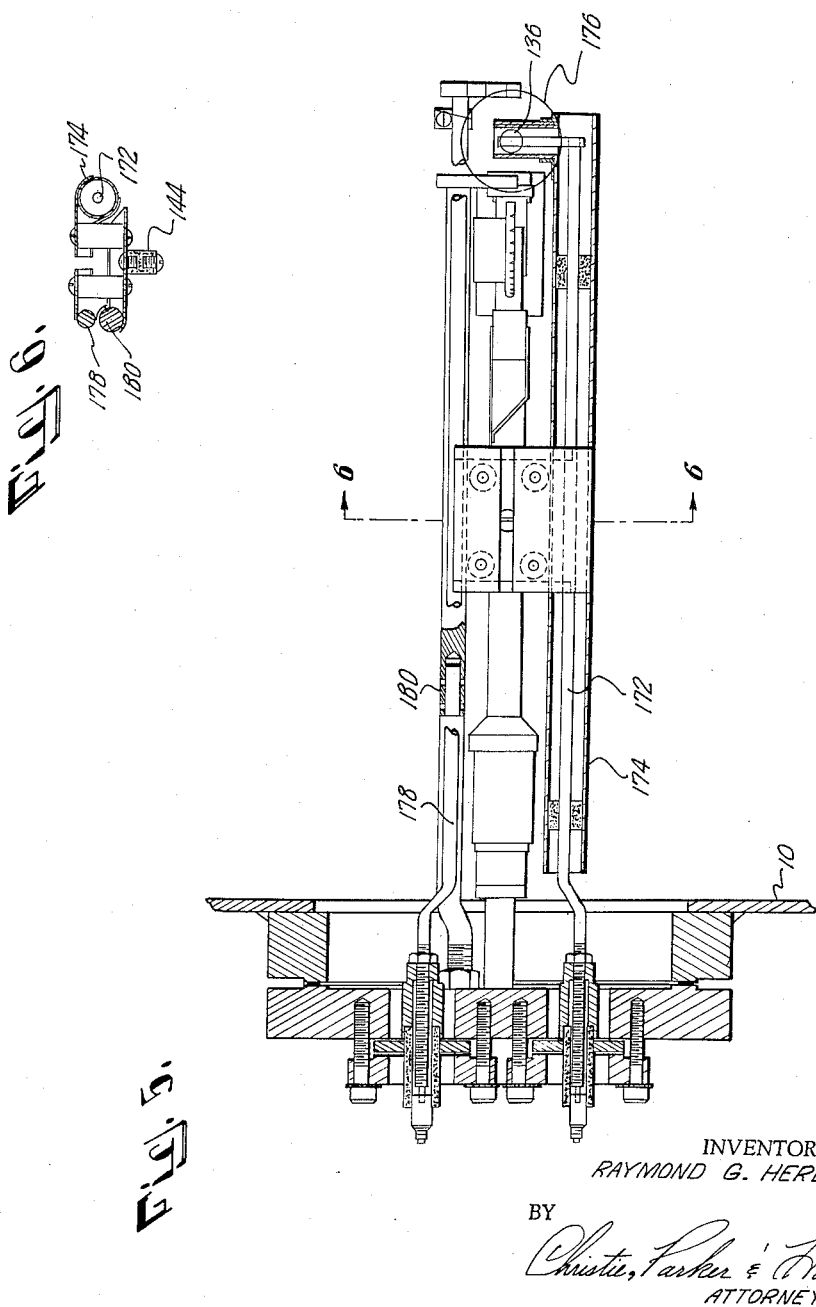

Jan. 3, 1961
R. G. HERB
2,967,223
FEEDER MECHANISM
Filed Nov. 26, 1958
5 Sheets-Sheet 5
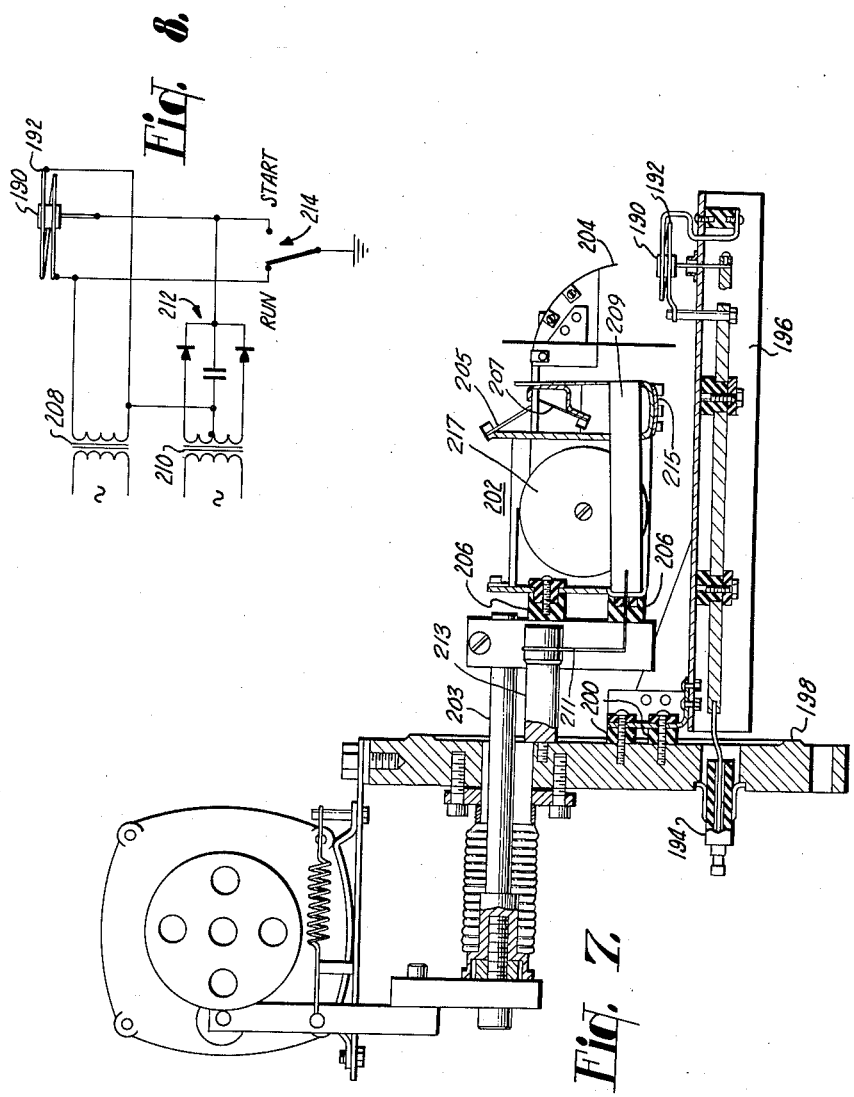
INVENTOR.
RAYMOND G. HERB
BY
Christie, Parker & Hale
ATTORNEYS United States Patent Office 2,967,223
Patented Jan. 3, 1961

2,967,223
FEEDER MECHANISM

Raymond G. Herb, Madison, Wis., assignor to Wisconsin Alumni Research Foundation, Madison, Wis., a nonprofit corporation of Wisconsin Filed Nov. 26, 1958, Ser. No. 777,542

12 Claims. (Cl. 219—19)

This invention relates to apparatus for feeding an elongated member such as a wire to a heated surface on which the wire is to be evaporated.

This application is a continuation-in-part of my application Serial No. 666,144 filed June 17, 1957, now abandoned.

The invention is particularly useful in vacuum pumping devices in which a getter material is evaporated and subsequently condensed to trap gas molecules and thereby provide a pumping action. However, the invention is also useful in other arrangements in which material is evaporated, such as in apparatus for coating metal in a vacuum.

In such evaporating arrangements, it is desirable to provide the material which is to be evaporated in the form of an elongated member, such as a wire, so that the rate of evaporation may be controlled by controlling the rate at which the material is fed to the heated surface at which it is evaporated. Also, most materials which are employed in such evaporation arrangements are readily available in wire form. For example, titanium is a preferred getter material for use in a vacuum pump, and titanium wire is available on a commercial basis.

When such materials are fed to an evaporation chamber, the evaporated material tends to condense on the portions of the feeder which are in close proximity to the surface on which the material is evaporated. Frequently the condensation of the material obstructs the outlet from which the material is fed into the chamber, thereby disrupting the feeding action. Such a disruption is particularly troublesome in the operation of a vacuum chamber because ordinarily the chamber must be opened in order to remove the obstruction from the outlet of the feeder. Thus, the operation of the vacuum chamber must be stopped completely in order to remove such an obstruction, and then the chamber must be evacuated again in order to resume operation of the apparatus.

This difficulty is overcome in accordance with the present invention by feeding the elongated member which is to be evaporated through a guide member which is moved back and forth with respect to the surface at which the wire is to be evaporated.

In one embodiment of the invention, the outlet of the guide member is positioned so that it is located adjacent and pointed toward the evaporating surface during its forward movement to cause a portion of the elongated member to be evaporated and so that it is retracted from the heated surface a substantial distance during its backward movement so that very little of the evaporated material will collect on the guide member when it is in its retracted position.

In another embodiment of the invention, the outlet of the guide member is spaced from the evaporating surface throughout the movement of the guide member, and the guide member imparts curvature to the elongated member which is fed through it so as to direct the elongated member toward the evaporating surface and cause it to engage the evaporating surface during each cycle of movement of the guide member.

The back and forth movement of the guide member may be controlled as desired. In most instances it is desirable to provide a rapid approach and a rapid departure from the evaporating surface so as to minimize the amount of the evaporated material which collects on the guide member. Such back and forth movement resembles the movement of the well-known toy ducks which dip back and forth from a perch such as the edge of a bowl. For that reason, the feeder mechanisms of the present invention have been termed "Dipping Duck Feeders."

In both of these embodiments of the invention the end of the material which is being evaporated is cooled when it is retracted from the evaporating surface and this greatly reduces the tendency for a large drop of molten material to form at the end of the material which is being evaporated. Also, the outlet of the guide member may be cut at a slant so that the inside of the guide member is not ordinarily exposed to the evaporating surface.

In addition, these embodiments of the invention permit the mounting of the evaporator and the feeder as one unit if desired. Such unitary mounting facilitates the initial installation and alignment of the apparatus and it also facilitates the maintenance of the evaporator and feeder.

By applying a suitable potential between the evaporating post and the filament which heats the post, these embodiments of the invention may be arranged to start operating at relatively high pressures without requiring a primer for initially reducing the pressure in the evaporation chamber.

The invention is explained in detail with reference to the drawings, in which:

Fig. 1 shows one embodiment of the feeder mechanism employed in a vacuum pump which uses gettering and ionization techniques;

Fig. 2 is a top view of a portion of the feeder mechanism taken along line 2—2 of Fig. 1;

Fig. 3 is a sectional view of a portion of the pumping apparatus, taken along line 3—3 of Fig. 1;

Fig. 4 is an elevation view of an alternative embodiment of the feeding mechanism;

Fig. 4A is a fragmentary view along line 4A—4A of Fig. 4 showing the mechanism for moving the actuator arm;

Fig. 5 is a fragmentary top view of the apparatus of Fig. 4, partially in section;

Fig. 6 is a sectional view along line 6—6 of Fig. 5;

Fig. 7 shows an embodiment of the feeder mechanism arranged to permit the application of a high potential between the evaporating post and the heating filament to permit starting the pump without the use of a primer; and Fig. 8 shows the electrical circuit for the apparatus of Fig. 7.

Fig. 1 illustrates the use of one embodiment of the feeder apparatus of the present invention in a vacuum pump which employs gettering and ionization techniques. The pumping apparatus itself is disclosed and claimed in my co-pending application Serial No. 573,522 entitled "Vacuum Pump" which was filed on March 23, 1956. A similar vacuum pump in which the apparatus of the present invention may be employed is disclosed in my co-pending application Serial No. 546,025 entitled "Pump" which was filed on November 10, 1955, now Patent No. 2,850,225 issued September 2, 1958.

With reference to Fig. 1, the pumping apparatus is located in a housing comprising a cylindrical body member 10 having an inlet port 12 at one end and a closure member 14 at the other end. These members define a chamber of approximately cylindrical shape which is to be evacuated. The chamber may be provided with a valved port 16 for coupling the chamber to a forepump for use in reducing the pressure in the chamber before the ionization and gettering actions are initiated.

The gettering action of the pump is provided by the material which is fed by the feeder mechanism 18 to a post 20 which is heated by a filament 22. The post 20 should provide a broad, flat, horizontal surface on which the getter material is evaporated. Power for heating the filament 22 is provided from the secondary winding 24 of a transformer 26.

The getter material 28 in wire form is stored on a storage reel 30 which is supported by a frame 32 (see Fig. 2). A guide member 34 is supported by the frame 32 and aligned with the storage reel for guiding the getter material from the reel to the heated post 20. An auxiliary guide member 36 is also mounted on the frame 32, and it serves to guide the getter material from the reel to the main guide member 34. A feed device 38 is supported on the frame 32 by a pair of leaf springs 40. The feed device 38 is provided with an actuating arm 42 which engages a fixed arm 44 each time that the feeding mechanism is moved upwardly. The feed device 38 is provided with an arrangement for gripping the getter wire when the feeding device is moved from left to right, and the gripping arrangement does not grip the wire when the feed device 38 is moved from right to left. Hence, each time that the feeding mechanism is moved upwardly the feeder 38 moves from right to left along the getter wire. When the feeding mechanism is moved downwardly the leaf springs 40 cause the feed device 38 to move a small portion of the getter wire from left to right. The getter wire which is moved from left to right by the feed device 38 passes through the guide member 34 from which it is directed to the heated post 20.

The up and down movement of the feeder mechanism is provided by a shaft 46 which extends through the housing of the vacuum chamber and which is coupled to the frame 32 by an insulator 48. A bellows 50 is coupled between the actuating shaft 46 and the housing of the vacuum chamber to provide a flexible vacuum-tight seal which permits movement of the shaft.

The shaft 46 is moved by a motor 52 having a cam 54 affixed to its output shaft. The movement of the motor cam 54 is sensed by a cam follower 56 which in turn is coupled through a pair of links 58 and 60 to the actuating shaft 46.

Thus, rotation of the motor 52 causes the feeder mechanism 18 to move up and down, with the amount of movement and the speeds of movement during each cycle of operation being determined by the shape of the cam 54. A portion of the getter wire is fed to the heated post 20 during movement of the guide member 34 toward the heated post. As soon as a portion of the getter wire is deposited on the post 20, the feeder mechanism causes the guide member to move away from the post 20 quickly so as to reduce the amount of the evaporated getter material which condenses on the guide member. This greatly reduces the tendency of the outlet of the guide member to become plugged with condensed getter material. Also, there is less tendency for a large drop of molten getter material to form on the end of the getter wire.

It is desirable to construct the guide member 34 of a material which is a good conductor of heat, such as copper. This distributes the heat which comes from the evaporator post and the filament, thereby cooling the outlet end of the guide member. Many getters, such as titanium, adhere strongly to a hot surface. Cooling the outlet of the guide member reduces the likelihood that condensation on the tip will plug the guide member.

By way of example, the outlet of the guide member may be moved from one-half inch to one inch away from the heated post, and during each cycle of operation the getter wire may be advanced one-sixteenth to one-eighth inch.

The getter material which is evaporated by the post 20 tends to condense on the cooler portions of the pump structure. A reflector 70 may be provided for directing the getter material through the main portion of the chamber and toward the inner wall of the housing 10. Also, it is desirable to provide a cooling coil 72 through which a liquid is circulated to cool the housing. With such an arrangement, most of the getter material condenses on the wall of the housing 10 where it traps gas molecules. Continued evaporation of the getter material serves to trap additional gas molecules, and it also serves to bury previously trapped gas molecules, so that very few of the trapped molecules escape back into the chamber.

This gettering process provides a substantial pumping action. However, in many cases it is desirable to augment this pumping action by an ionization pumping arrangement, and such an ionization arrangement is employed in the apparatus of Fig. 1.

The ionization arrangement employs electrode means for directing electrons into the space in which gas is to be ionized or dissociated and for driving the ionized or dissociated gas molecules to the inner surface of the housing 10.

The electrode structure comprises an end portion 80 in the form of an annular ring across which a plurality of wires 82 are strung. The other portion of the electrode structure comprises a cylindrical electrode 84 composed of a pair of end rings having a plurality of wires 86 extending between them.

The large electrode structure 84 is supported by a plurality of shielded insulators 88 which are mounted on a stainless steel framework 90. The end electrode 80 is supported by a plurality of insulators 92 which are mounted on a plate 94.

A thermionic filament 96 is located adjacent the electrode 80. The filament is supported by springs 98, and it is provided with electric current at the terminals 100 and 102 (see Fig. 3) from the secondary winding 104 of the transformer 26. The circuit interconnecting the secondary winding 104 and the terminals 100 and 102 is not shown in order to simplify the drawing.

The plate 94, and a grid 106 provide an electrical shield between the evaporating apparatus and the remainder of the device so as to electrically isolate these two portions of the apparatus. Preferably the plate 94 and the isolation grid 106 are maintained at ground potential.

It is desirable to maintain the evaporator post 20 at a positive potential with respect to the evaporator filament 22 so that most of the electrons which are emitted by the evaporator filament will bombard the evaporator post and heat it. This may be achieved by a source of potential 108 coupled between the evaporator post and ground.

In order to provide the desired ionization action, the electrodes 80 and 84 are maintained at a positive potential with respect to the ionization filament 96 and also with respect to the wall of the housing 10. The potentials for these electrodes may be provided by sources of potential 110 and 112. Only one source of potential may be employed, and the electrodes 80 and 84 may be connected to one another inside the chamber if desired.

It is desirable to maintain the ionization filament 96 at a positive potential with respect to the plate 94 and the isolation grid 106. This may be achieved by a source of potential 114 coupled between the transformer winding 104 and the housing.

When the operation of the pump is initiated, it is usually desirable to reduce the pressure inside the chamber before the ionization and gettering actions of the pump are initiated. This may be done by the use of a forepump coupled to the valved port 16, and by evaporating gettering material from a primer 116. The primer comprises a plurality of short pieces of getter material 118, such as titanium, wound around conductive rods which may be heated by applying an electric current through the rods.

To initiate operation of the apparatus of Fig. 1, the pressure is first reduced by the use of a suitable mechanical pump coupled to the valved port 16. The two filaments may then be brought up to temperature and the electric potentials may be applied to the evaporator post 20 and to the electrodes 80 and 84. Electric current is then applied to one of the conductors of the primer to evaporate the getter on that conductor. When the temperature of the evaporator post 20 is sufficiently high to evaporate the getter, the motor 52 may be actuated to feed the getter wire to the evaporator post at a substantially constant rate. The pump is then in full operation.

The electrons which are emitted from the ionization filament 96 are drawn by the positive potential of the electrode 80 into the ionization space which is defined by the electrodes 80 and 84. The electrons which pass through the electrode 84 are drawn back into the space which is enclosed by this electrode due to the positive potential of this electrode with respect to the walls of the chamber. Thus, the electrons tend to remain in the ionization space which is enclosed by the electrodes. When gas molecules are bombarded by the electrons, they are ionized or dissociated by the impact, and then they tend to drift toward the outer periphery of the chamber. The positive ions which move into the space between the electrode 84 and the inner wall of the housing 10 are driven by the positive potential of the electrode 84 into the surface of the housing 10 where they are collected. Deposition of the getter material provides an active surface along the wall of the housing 10 for collecting the gas molecules, and the continued deposition of the gettering material buries previously trapped gas molecules so that they cannot escape.

It has been found that it is desirable to evaporate the getter material at a fast rate when it is desired to pump at high pressures. This produces a burst of evaporated getter material which for some reason has a greater tendency to move to the surface of the housing where it is collected than does the evaporation of smaller amounts of the getter material. When smaller amounts of the getter material are evaporated, more of the getter material tends to collect on the evaporator post.

It has been found that the build-up of the getter material on the guide member 34 can be reduced by the use of a layer of carbon on the outlet end of the guide member. Also, it has been found that conduction cooling of the guide member is desirable in order to reduce the tendency of the guide member to plug due to the melting of getter material inside the guide member. Conduction cooling may be achieved by coating the guide member 34 with a material, such as copper, which is a good conductor of heat. I prefer to achieve conduction cooling of the guide member by constructing the entire guide member 34 of copper.

In some instances when titanium is employed as the getter material it is helpful to employ hydrogen to clean out the pump chamber. By way of example, hydrogen may be bled into the chamber just prior to shutting down the pump operation. The hydrogen is bled in to bring the pressure of the chamber up to atmospheric pressure. This serves to disintegrate the titanium which has condensed on the wall of the housing and on other parts inside the housing so as to cause the titanium deposits to fall to the bottom of the pump. The fragmentations of titanium may be removed from the bottom of the chamber when the chamber is opened.

Figs. 4 through 6 illustrate another embodiment of the feeder apparatus of the invention. In this embodiment, the outlet of the guide member is spaced from the evaporator post throughout its movement, and the guide member imparts a curvature to the wire which is fed through it so as to direct the wire to the evaporator post and cause the wire to engage the evaporator post during each cycle of movement of the guide member. With this arrangement the outlet end of the guide member is not directly exposed to the material which is being evaporated and hence very little of the material condenses on the guide member.

The wire which is to be evaporated is stored on a reel 130 which is mounted on a frame 132. A guide member 134 is aligned with the spool to receive the wire from it. It is highly desirable in this embodiment of the invention to use a guide member which is a good conductor of heat, such as copper, so that the guide member distributes the heat which comes from the evaporator post and filament. This causes the guide member to heat the wire which is fed through it to remove stresses from the wire and cause the wire which emerges from the guide member to have substantially the same curvature as the guide member. With this arrangement, the wire is curved so that it engages the evaporator post 136 even though the outlet of the guide member is always spaced a substantial distance from the evaporator post. Also, the use of a guide member which is a good conductor of heat cools the outlet of the guide member and thereby reduces the likelihood that condensation of getter material on the outlet will plug the guide member.

A feed device 138 is disposed between the storage spool and the guide member for feeding a small portion of the wire through the guide member during each cycle of operation of the feeder mechanism. The feed device 138 is coupled to the frame 132 by a leaf spring 139. The feed device 138 is actuated by a rigid arm 140 which is slotted at its end to engage a piece of spring steel 142 which in turn is supported by a fixed insulator 144. The insulator 144 is mounted on the fixed shield 146 which encloses the electrical conduits for the post and for the filament for heating the post. Thus, the spring steel member 142 restrains the arm 140 from substantial motion up and down, yet it permits some freedom of movement of the arm 140 in a horizontal plane so that the feeder mechanism may be adjusted in that plane.

The feeder mechanism is mounted on the arm 148 so that it is moved up and down by an arm 148 which is coupled through an insulator 150 to an actuator arm 152. The actuator arm 152 extends through a flexible bellows 154 to an end member 156.

A pair of pivot supports 158 located on each side of the bellows extend between the end member 156 and the plate 160 on which the feeder mechanism is mounted. The pivots 158 provide a pivot point about which the shafts 152 and 148 move during operation of the feeder mechanism.

The pivot members are provided with adjustable screws 162 so that the feeder mechanism may be adjusted inwardly or outwardly in the chamber by adjusting these screws. Also, the screws 162 may be adjusted to control the angular position of the feeder mechanism inside the housing.

The end member 156 is coupled to a link 164 which carries a cam follower roller 166. The cam follower roller is actuated by a cam 168 which in turn is actuated by a motor 170.

An electric potential may be applied to the evaporator post through a conductor 172 which is provided with a shield 174 (see Fig. 5). The use of such a shield helps to prevent glow discharge current to this conductor. If this apparatus is employed in a vacuum pump of the general type illustrated in Fig. 1, such restriction of the glow discharge permits the pump to be started at higher initial pressures.

Electric current for the filament 176 for heating the evaporator post is provided through a pair of conductors 178 and 180. The conductor 180 may be grounded, since it is ordinarily desirable to operate one end of the filament 176 at ground potential.

Figures 7 and 8 show a preferred arrangement which is suitable for starting the evaporator at relatively high pressures without requiring the use of a primer to reduce the pressure when the apparatus is initially started.

A high voltage, say 2000 volts, is applied between the heating filament and the evaporating post, with the post being maintained positive with respect to the filament so as to attract the electrons and thereby cause the post to be heated by electron bombardment even at relatively high pressures.

The evaporating post 190 and the filament 192 are connected to conductors which have terminals 194 in the wall of the evacuation chamber to which suitable potentials are applied. A shield 196 is disposed about the conductors which lead to the terminals in the wall of the evacuation chamber so as to prevent glow discharge when the high voltage is applied. The shield 196 is insulated from the plate 198 on which the feeder mechanism is mounted by the insulators 200.

The mechanism 202 for feeding the material 204 to be evaporated is also insulated from the support plate by insulators 206. The feeding mechanism is otherwise similar to that shown in Figs. 1 and 4. The mechanism 202 for feeding the material to be evaporated is affixed to and is moved up and down by the arm 203 which is actuated by the same type mechanism which actuates the arm 148 of Figs. 4 and 4A. The material 204 to be evaporated is fed by the gripping members 205 and 207. The gripping member 205 is mounted on and moves with the mechanism 202 and it serves to prevent backward movement of the material to be evaporated. The gripping member 207 is mounted on a frame 209 which is supported by a member 211, extending from an insulator 213 which is affixed to the plate 198. The frame 209 is coupled to the mechanism 202 through a hinge 215 which serves to maintain the gripping member 207 in the proper position to engage the material 204 as it emerges from the reel 217. Thus, when the arm 203 moves upwardly it moves the mechanism 202 and the gripping member 205 upwardly with respect to the gripping member 207 and a small portion of material 204 to be evaporated is unreeled. When the arm 203 moves the gripping member 205 downwardly with respect to the gripping member 207, the gripping member 205 forces the material 204 to be evaporated past the gripping member 207 and toward the evaporating post 190.

A desirable way to operate the apparatus of Fig. 7 is to ground the evaporating post 190 to the housing while the apparatus is being started and then transfer the ground from the evaporating post to the filament 192 for the remainder of the operation of the apparatus. Fig. 8 illustrates one electrical circuit for carrying out this arrangement. Power for the filament 192 is provided by a transformer 208, and the high voltage is provided by a transformer 210 and a rectifier 212. The positive terminal of the high voltage source is connected to the post 190 and the negative terminal is connected to the filament. A switch 214 may be actuated to connect the evaporating post 190 to ground while the apparatus is being started and to transfer the ground to the filament 192 when the apparatus is running after the initial starting operation. Transferring the ground from the evaporating post to the filament reduces the number of electrons which are attracted to the housing and lost, thereby saving power while the apparatus is running after the initial starting period.

The feeder mechanisms of Figs. 4 through 8 are suitable for use in the same type of applications as the feeder which is disclosed in Figs. 1 and 2 of the drawings. Such a feeder mechanism may be located in either the upper or the lower end of a vacuum pump of the type illustrated in Fig. 1 employing gettering and ionization techniques. It will be apparent that the feeder mechanism may be employed in various other types of apparatus, such as in a pump chamber which employs gettering techniques alone, or in apparatus for vacuum coating metal on objects.

The guide member 134 of Fig. 4 has its outlet oriented at right angles with respect to the direction of movement of the guide member. The guide members of Figs. 1 and 7 have their outlets oriented along the direction of movement of the guide member. It will be apparent that the outlet of the guide member may be oriented at various other angles with respect to the direction of movement of the guide member, say at any angle between 0° and 90°.

The post and filament arrangement shown in Figs. 4 and 7 are preferred. It has been found that the posts function best when the filament circumscribes the post midway along its length.

In the various embodiments of the invention shown in the drawings electric motors are shown for driving the feeder mechanism. However, it will be apparent that other driving arrangements, such as an electromagnetic actuator, may be employed.

I claim:

1. In apparatus for evaporating a wire in a housing which defines a vacuum chamber, a feeder for feeding the wire to a heated surface in the chamber at which the wire is to be evaporated, comprising storage means located inside the vacuum chamber for holding a supply of the wire, a guide member located adjacent the storage means inside the chamber for receiving wire from the storage means and guiding it to the heated surface, means disposed between the storage means and the guide member for feeding wire from the storage means to the guide member, a shaft extending through the housing of the vacuum chamber and coupled to the guide member, a flexible vacuum-tight seal located between the shaft and the housing of the vacuum chamber to permit movement of the shaft, and a motor coupled to the end of the shaft which is located outside the housing for moving the shaft to cause the guide member and the wire guided by it to move back and forth with respect to the heated surface at which the wire is to be evaporated, so that the back and forth movement of the guide member causes a portion of the wire to be evaporated during each cycle of the movement and so that the evaporated material does not tend to plug the guide member and thereby interfere with movement of the wire through the guide member.

2. The apparatus of claim 1 wherein the outlet of the guide member is positioned so that it is located adjacent the heated surface during its forward movement to cause a portion of the wire to be evaporated and so that it is retracted from the heated surface during its backward movement to reduce the amount of the evaporated material which collects on the guide member.

3. The apparatus of claim 1 wherein the outlet of the guide member is spaced from the heated surface throughout its movement, and wherein the guide member is curved so that the curvature which it imparts to the wire which is fed through it directs the wire toward the heated surface and causes the wire to engage the heated surface during each cycle of movement of the guide member.

4. The apparatus of claim 1 having a filament for heating the surface at which the wire is to be evaporated by electron bombardment, a source of high voltage, conductors connected between the source of high voltage and the filament and the surface at which the wire is to be evaporated for maintaining the surface at a positive potential with respect to the filament, and a shield disposed about the portion of said conductors which are located inside the vacuum chamber for preventing glow discharge in the chamber due to the high voltage.

5. The apparatus of claim 1 further including a filament for heating the surface at which the wire is to be evaporated by electron bombardment, a source of high voltage connected between the filament and the surface at which the wire is to be evaporated for maintaining the surface at a positive potential with respect to the filament, and means for selectively connecting either the filament or the surface at which the wire is to be evaporated to the housing which defines the vacuum chamber, so that said surface may be grounded to the housing when the evaporating apparatus is being started and so that the filament may be grounded to the housing after the initial starting period.

6. In apparatus for evaporating an elongated member in a housing which defines a vacuum chamber, a feeder for feeding the elongated member to a heated surface in the chamber on which the wire is to be evaporated, comprising storage means located inside the vacuum chamber for holding a supply of the elongated member, a guide member located adjacent the storage means inside the chamber for receiving the elongated member from the storage means and guiding it to the heated surface, means disposed between the storage means and the guide member for feeding the elongated member from the storage means to the guide member, a shaft extending through the housing of the vacuum chamber and coupled to the guide member, a flexible vacuum-tight seal located between the shaft and the housing of the vacuum chamber to permit movement of the shaft, and a motor coupled to the end of the shaft which is located outside the housing for moving the shaft to cause the guide member and the elongated member guided by it to move back and forth with respect to the heated surface at which the elongated member is to be evaporated, so that the back and forth movement of the guide member causes a portion of the elongated member to be evaporated during each cycle of the movement and so that the evaporated material does not tend to plug the guide member and thereby interfere with movement of the elongated member through the guide member.

7. A feeder for feeding wire to a surface at which it is to be evaporated, comprising a storage means for holding a supply of the wire, a guide member located adjacent the storage means for receiving wire from the storage means and guiding it to the surface at which it is to be evaporated, means disposed between the storage means and the guide member for feeding wire from the storage means to the guide member, and means coupled to the guide member for moving the guide member and the wire which is guided by it back and forth approximately perpendicularly with respect to the surface at which the wire is to be evaporated, so that the back and forth movement causes a portion of the wire to be evaporated during each cycle of the movement and so that the evaporated material does not tend to plug the guide member and thereby interfere with movement of the wire through the guide member.

8. The apparatus of claim 5 wherein the guide member is disposed to have its outlet pointing to a location spaced from the surface at which the wire is to be evaporated, and wherein the guide member is curved so that the curvature which it imparts to the wire which is fed through the guide member causes the wire to engage said surface during each cycle of movement of the guide member.

9. The apparatus of claim 5 wherein the means for moving the guide member back and forth causes the guide member during its forward movement to have its outlet located adjacent and pointing toward the surface at which the wire is to be evaporated and during its backward movement to withdraw the outlet of the guide member from the vicinity of said surface.

10. The apparatus of claim 7 further including a filament for heating the surface at which the wire is to be evaporated by electron bombardment, and a high voltage source coupled between the filament and said surface for maintaining the surface at positive potential with respect to the filament.

11. A feeder for feeding an elongated member to a location at which it is to be evaporated, comprising a storage means for holding a supply of the elongated member, a guide member located adjacent the storage means for receiving the elongated member from the storage means and guiding it to a predetermined location, means disposed between the storage means and the guide member for feeding the elongated member from the storage means to the guide member, and means coupled to the guide member for moving the guide member and the elongated member which is guided by it back and forth with respect to the location at which the elongated member is to be evaporated, so that the back and forth movement causes a portion of the elongated member to be evaporated during each cycle of the movement and so that the evaporated material does not tend to interfere with movement of the elongated member through the guide member.

12. A feeder for feeding a wire to a location at which it is to be evaporated, comprising a storage means for holding a supply of the wire, a guide tube located adjacent the storage means for receiving wire from the storage means and guiding it to a predetermined location, means disposed between the storage means and the guide tube for feeding wire from the storage means to the guide tube, and means coupled to the guide tube for moving the guide tube and the wire guided by it back and forth with respect to the location at which the wire is to be evaporated, so that the back and forth movement causes a portion of the wire to be evaporated during each cycle of the movement and so that the evaporated material does not tend to plug the guide tube and thereby interfere with movement of the wire through the guide tube.

References Cited in the file of this patent
UNITED STATES PATENTS

| | | |
|---|---|---|
| 1,207,068 | Pagliarul | Dec. 5, 1916 |
| 2,153,786 | Alexander et al. | Apr. 11, 1939 |
| 2,621,625 | Brown | Dec. 16, 1952 |
| 2,665,229 | Schuler et al. | Jan. 5, 1954 |